April 24, 1956   R. F. BARRELL   2,743,327
FLUID FLOW RESPONSIVE APPARATUS
Filed April 10, 1953
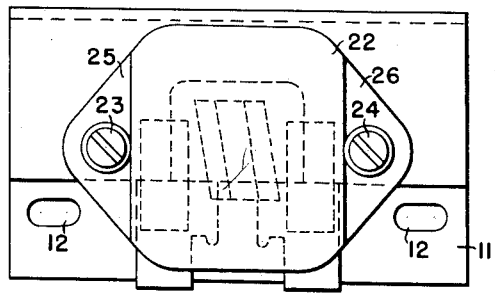
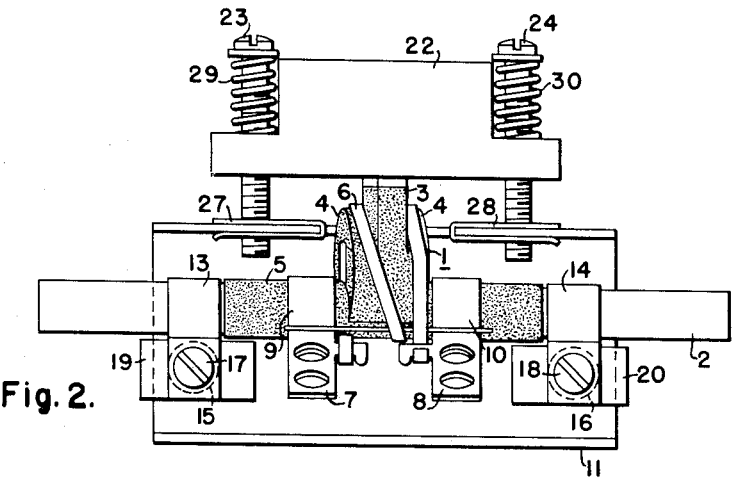
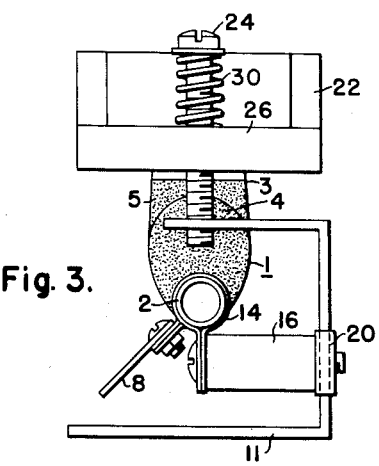
WITNESSES:
John E. Hensley
E. F. Oberheim
INVENTOR
Robert F. Barrell.
BY
Paul E. Friedemann
ATTORNEY

United States Patent Office 2,743,327
Patented Apr. 24, 1956

2,743,327

FLUID FLOW RESPONSIVE APPARATUS

Robert F. Barrell, Lancaster, N. Y., assignor to Westinghouse Electric Corporation, East Pittsburgh, Pa., a corporation of Pennsylvania Application April 10, 1953, Serial No. 347,880

10 Claims. (Cl. 200—136)

This invention relates generally to an apparatus responsive to the flow of fluid through a fluid conductor and more particularly relates to such apparatus wherein a separately heated heat conducting device is arranged in heat exchanged relationship with a fluid and a thermo-responsive device.

Devices of this type are applicable in a wide variety of systems in which fluids are used for either cooling or heating. One specific application may be found in welding systems wherein water is utilized to cool the electronic tubes which carry the welding current. In these systems it is essential that the water flow through the cooling system of the tubes be adequate to carry off the heat; otherwise the tubes may be damaged.

In applications of this type the fluid flow responsive device or devices constitute a part of the equipment which is sold. Since the function of such devices is primarily of a protective nature and does not contribute directly to system performance; that is, in the sense of controlling welding current or the like, in order to keep the cost of such equipment at a minimum, it is desirable that the cost of miscellaneous protective devices associated therewith be kept at a minimum.

Accordingly it is one object of this invention to provide a fluid flow responsive device which is simple with respect to operational requirements and positive in operation.

Another object of this invention is to provide a device of the character described having a simple geometric configuration and having a minimum number of parts.

It is also an object of this invention to provide a fluid flow responsive device in which the parts are easily manufactured and assembled.

It is a specific object of this invention to provide an improved fluid flow switch in which heat exchange among the several elements in the thermal system is accomplished efficiently.

The foregoing statements are merely illustrative of the various aims and objects of this invention. Other objects and advantages will become apparent from a study of the following specification when considered in conjunction with the accompanying drawings in which:

Figures 1, 2 and 3 are respectively plan, elevation and end views of a fluid flow responsive device embodying the principles of this invention.

In the drawings, the fluid flow responsive device comprises a substantially U-shaped thermal block generally designated 1 of a material such as copper having high thermal conductivity. This thermal block is disposed in inverted position over a fluid conductor 2 and secured thereto by brazing or welding or other suitable means. In accomplishing this, the lower ends of the legs of the thermal block are shaped to the configuration of the surface of the fluid conductor 2 in order to provide a contacting surface which is as large as possible to afford good heat exchange between the fluid conductor and the thermal block. The upper end of this thermal block as seen, for instance, in Figs. 2 and 3 is provided with a vertical projection 3 of substantially rectangular cross section which is located substantially centrally of the U-shaped block providing shoulders 4 on opposite sides thereof.

The assembly thus described is covered with an electrical insulating material generally designated 5. This may be any suitable type of electrical insulating material, however, in a practical embodiment of this invention a ceramic cement coating is applied and thereafter cured, dried, or fused by heating. As will be seen by reference to Fig. 2 this insulating coating extends over the thermal block and up over the vertical projection 3 to a point adjacent its upper extremity and also extends a short distance on opposite sides of the thermal block along the fluid conductor 2.

A distributed electrical resistance heater is disposed over the surface of the thermal block. This electrical resistance heater comprises a ribbon or strip of resistance which may, for instance, be Nichrome, however, any suitable type of resistance material may be used. This ribbon of resistance material which is designated 6 is distributed over the surface of the thermal block by winding it thereabout over the insulating material and connecting the ends thereof to respective electric terminals 7 and 8 which are mounted on respective clamps 9 and 10 clamped about the fluid conductor 2 on opposite sides of thermal block 1 over the insulating material 5.

This sub-assembly is mounted on a channel shaped support 11 which is provided with mounting holes 12 in one of the sides of the channel and constitutes the mounting base of the unit. The thermal block assembly is secured to the bight of the channel by means of respective clamps 13 and 14 secured to the fluid conductor at spaced points on opposite sides of the thermal block. These clamps are respectively secured to mounting lugs 15 and 16 by means of respective screws 17 and 18 extending through clamps 13 and 14 and the respective lugs and threadedly engaging U-shaped sheet metal nuts 19 and 20 which are slipped over the bight of the channel at its opposite ends.

A thermoresponsive switch 22 or other thermoresponsive device, the details of which are not shown in the interest of simplicity, is seated upon the upper flat face of the vertical extension 3 of the thermal block. The thermal switch is secured in this position by respective screws 23 and 24 which clear through suitable holes in mounting lugs 25 and 26 on the thermal switch housing and threadedly engage the sheet metal nuts 27 and 28 which are mounted on the upper side of the channel. Springs 29 and 30 are disposed between the heads of these respective screws and the mounting lugs, and are pre-loaded in such degree as may require to provide the required force of engagement between the thermal switch 22 and vertical projection 3.

In the specific application of this flow switch in the cooling system for the electronic tubes of a welding system the flow switch functions in the following manner.

The electronic tube cooling water is passed through the fluid conductor 2 of the flow switch on its way out of the control cabinet in which the tubes are mounted. In one application, 78 watts of power are dissipated from the Nichrome ribbon 6 into the thermal block. Normally this heat is carried away by the water, and the thermo-responsive switch 22 mounted on the projection 3 of the thermal block remains below its tripping temperature. However, if the cooling water temperature exceeds 40° C. or if the flow of water (40° C. water) drops below one and one half gallons per minute or if the water flow fails completely, the temperature of the thermal block rises and the thermostat is actuated.

In one embodiment of this invention the thermoresponsive device is a switch having two normally closed contacts which are actuated by a thermal element, such as a bimetal, to open position when the bimetallic element is sufficiently heated. When connected into the system one contact opens the electronic tube control circuit and the other contact opens the power source to the resistor 6. Thus the flow switch starts to cool and eventually will close reapplying power to itself and to the tube control circuit. If the fault has not been removed in the meantime the device will again trip. This cycle is repeated until the water condition is rectified.

In the specific system presently under consideration, the flow switch is designed so that with 40° C. water flowing in the tube at one and one half gallons per minute and 78 watts of power input to the unit the temperature at the theremal block is 50° C. which is the threshold of the thermostat tripping point. This calibration is a function of the power input to the device and the exact geometric design of the resistor tube assembly.

From the foregoing it will be appreciated that the flow switch of this invention accomplishes the stated objects in that it is of simple geometric configuration, both in its parts and in its organization, resulting in a structure which is easily fabricated both with respect to its parts and with respect to assembly.

Moreover the design of the switch is such that the device is relatively efficient in operation. One important aspect of this design resides in the configuration of the thermal block and in the distributed disposition of the electrical resistance ribbon or strip 6 thereover to afford a relatively large area of heat exchange between the electrical resistance ribbon and the block. Similar considerations apply in the mounting of the thermal block upon the tube 2 and also in the mounting of the thermoresponsive device 22 on the flat upper face of the vertical projection 3 at the top side of the thermal block.

It will be appreciated by those skilled in the art that this invention may be modified through the substitution of parts deemed to be the equivalent of those illustrated herein and in the organization of such parts without departing from the spirit and scope of the disclosed subject matter. Accordingly, it is intended that the foregoing disclosure and the showings made in the drawings shall be considered only as illustrative of the principles of this invention and not be construed in a limiting sense.

I claim as my invention:

1. A fluid flow responsive device comprising, a tubular member of heat conducting material for conducting fluid, a thermal block of heat conducting material engaging said tubular member in heat exchanging relation therewith, a separate electrical heater disposed in close proximity to said thermal block for heating said thermal block, and thermal responsive means disposed in close proximity to said thermal block to respond to the heat thereof.

2. A fluid flow responsive device comprising, a fluid conductor of heat conducting material, a metal block of heat conducting material engaging said fluid conductor in heat-exchange relation therewith, electrical insulating means on said block, an electrical resistance strip having at least one turn about said block over said electrical insulating means, a pair of electrical terminals respectively connected to the ends of said electrical resistance strip affording connections for applying heating current to said electrical resistance strip to cause heating thereof to heat said block, and thermoresponsive means disposed in close proximity to said block to be heated thereby.

3. A fluid flow responsive device comprising a fluid conductor of heat conducting material, a metal block of heat conducting material engaging said fluid conductor in heat-exchange relation therewith, electrical insulating means on said block, an electrical resistance strip having at least one turn about said block over said electrical insulating means, a pair of electrical terminals respectively connected to the ends of said electrical resistance strip affording connections for applying heating current to said electrical resistance strip to cause heating thereof to heat said block, and thermoresponsive means having a portion thereof engaging said block to be in direct contact heat-exchange relation therewith.

4. A fluid flow responsive device comprising, a fluid conductor of heat conducting material, a metal block of heat conducting material engaging said fluid conductor in heat-exchange relation therewith, a baked ceramic electrical insulating coating on said block, an electrical resistance strip on said ceramic coating having at least one turn about said block, electrical terminal means connected to the ends of said electrical resistance strip providing for the application of heating current to said strip to cause heating of said block, and a thermoresponsive device disposed in heat-exhcange relation with said block to be heated thereby.

5. A fluid flow responsive device comprising, a fluid conductor of heat conducting material, a metal block of heat conducting material engaging said fluid conductor in heat-exchange relation therewith, a baked ceramic electrical insulating coating on said block, an electrical resistance strip on said ceramic coating having at least one turn about said block, electrical terminal means connected to the ends of said electrical resistance strip providing for the application of heating current to said strip to cause heating of said block, and a thermoresponsive device having a portion thereof engaging said block to be in direct contact heat-exchange relation with said block.

6. A fluid flow responsive device comprising a metallic fluid conductor of heat conducting metal, a metal block of heat conducting material secured to said fluid conductor in heat-exchange relation therewith, a baked ceramic insulating material over said block and sections of said fluid conductor on opposite sides of said block, a ribbon of electrical resistance material having at least one turn about said block over said ceramic material, electrical terminals mounted on said fluid conductor over said ceramic material on opposite sides of said block, the ends of said electrical resistance ribbon being connected to said respective terminals to provide connections for the application of heating current to said electrical resistance ribbon to heat said block through heat-exchange, and a thermoresponsive device disposed in close proximity to said block to be heated thereby.

7. A fluid flow responsive device comprising, a metallic fluid conductor of heat conducting metal, a metal block of heat conducting material secured to said fluid conductor in heat-exchange relation therewith, a baked ceramic insulating material over said block and sections of said fluid conductor on opposite sides of said block, a ribbon of electrical resistance material having at least one turn about said block over said ceramic material, electrical terminals mounted on said fluid conductor over said ceramic material on opposite sides of said block, the ends of said electrical resistance ribbon being connected to said respective terminals to provide connections for the application of heating current to said electrical resistance ribbon to heat said block through heat-exchange, and a thermoresponsive device having a portion thereof substantially engaging said block to be heated thereby.

8. A fluid flow responsive device comprising, a metallic fluid conductor of heat conducting metal, a metal block of heat conducting material secured to said fluid conductor in heat-exchange relation therewith, a strip of electrical resistance material distributed over said block and electrically insulated therefrom, electrical terminals respectively connected to the ends of said electrical resistance strip to provide for the application of heating current to said electrical resistance strip to heat said block through heat-exchange, and a thermoresponsive device disposed in close proximity to said block to be heated thereby.

9. A fluid flow responsive device comprising, a metallic fluid conductor of heat conducting metal, a metal block of heat conducting material secured to said fluid conductor in heat-exchange relation therewith, a strip of electrical resistance material distributed over said block and electrically insulated therefrom, a pair of electrical terminals respectively insulatedly mounted on opposite sides of said block on said fluid conductor, the ends of said electrical resistance strip being connected to the respective terminals affording connections for the application of heating current to said electrical resistance strip to heat said block by heat-exchange, and a thermoresponsive device disposed in close proximity to said block to be heated thereby.

10. A fluid flow responsive device comprising, a metallic fluid conductor of heat conducting metal, a metal block of heat conducting material secured to said fluid conductor in heat-exchange relation therewith, a strip of electrical resistance material distributed over said block and electrically insulated therefrom, a pair of electrical terminals respectively insulatedly mounted on opposite sides of said block on said fluid conductor, the ends of said electrical resistance strip being connected to the respective terminals affording connections for the application of heating current to said electrical resistance strip to heat said block by heat-exchange, and a thermoresponsive device having a portion thereof directly engaging said block to receive heat from said block.

References Cited in the file of this patent

UNITED STATES PATENTS

| | | |
|---|---|---|
| 1,902,427 | Sawyer | Mar. 21, 1933 |
| 2,349,673 | Pearson et al. | May 23, 1944 |
| 2,648,741 | Starbird | Aug. 11, 1953 |